INVENTORS
HARUTADA NEGORO, ETSUO AWADA,
YOSHIHIKO IKEGAMA, SABURO AKAGI AND KATSUAKI MATSUI

Wave Number (cm⁻¹)

Wave Number (cm⁻¹)

Wave Number (cm⁻¹)

INVENTORS
HARUTADA NEGORO, ETSUO AWADA
YOSHIHIKO IKEGAMA, SABURO AKAGI AND KATSUAKI MATSUI
BY

ATTORNEYS

United States Patent Office 3,477,995
Patented Nov. 11, 1969

3,477,995
POLYVINYL ACETAL DIALKYLAMINO ACETATE AND POLYVINYL PYRANYLETHER DIALKYLAMINO ACETATE
Harutada Negoro, Etsuo Awada, Yoshihiko Ikegami, Saburo Akagi, and Katsuaki Matsui, Tokyo, Japan, assignors to Sankyo Company, Limited, Tokyo, Japan
Continuation-in-part of application Ser. No. 184,889, Apr. 3, 1962. This application Oct. 21, 1965, Ser. No. 499,748
Claims priority, application Japan, Apr. 6, 1961, 36/11,974
Int. Cl. C08f 27/08
U.S. Cl. 260—73                    6 Claims

ABSTRACT OF THE DISCLOSURE

Novel polyvinyl dialkylamino acetate derivatives. The novel compounds form water-insoluble acid-soluble pharmaceutical coating compositions.

CROSS-REFERENCE TO PRIOR APPLICATION

Figure 1:
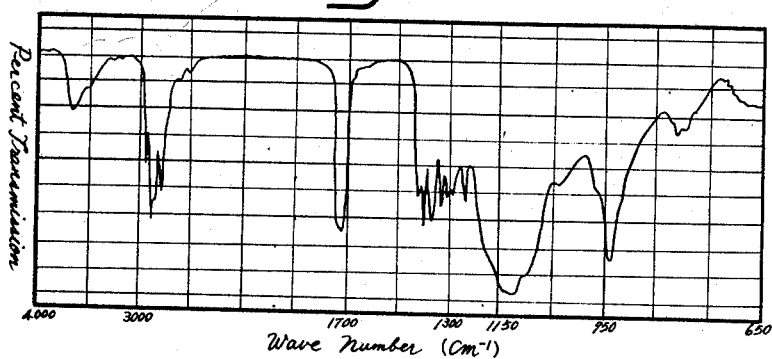

This is a continuation-in-part of application Ser. No. 184,889 filed Apr. 3, 1962, now abandoned.

This invention relates to novel pharmaceutical coating compositions and to a process for preparing the same. Furthermore, it relates to a process for coating pharmaceutical preparations suitable for oral administration and to pharmaceutical preparations coated by said process.

It has been proposed to cover preparations for oral administration which have an unpleasant flavor and which are to be dissolved in the stomach with a layer of sugar. Covering with sugar is, however, a time-consuming process which may disadvantageously require several days. Attempts to substitute the sugar coating with a covering composed of a synthetic resin which rapidly dissolved in the acid gastric juices have been made, in general, with unsatisfactory results. For example, coverings composed of certain sorts of synthetic resin are disadvantageous in that they are hardly dissolved in the gastric juice of hypoacidic or anacidic patients, although they are dissolved in normal gastric juices.

It is an object of this invention to provide new pharmaceutical coating compositions suitable for oral administration due to their large solubilities in the gastric juice of hypoacidic or anacidic patients as well as in normal gastric juices, and to provide a process for preparing such compositions.

Another object of this invention is to provide a process for coating pharmaceutical preparations suitable for oral administration and pharmaceutical preparations coated by said process. Other objects will be apparent from the detailed descriptions hereinbelow.

As a result of many years of studies for achieving the above-mentioned objects, we have found that (1) synthetic resins obtained by esterifying polyvinyl alcohol, partially butyralized polyvinyl alcohol or hydrolyzate of copolymer of vinyl acetate and crotonic acid with monochloroacetic acid, acetalizing the esterified product with an aliphatic aldehyde containing 2–4 carbon atoms and aminating the resulting acetal with a di-lower alkylamine containing 1–4 carbon atoms on each alkyl moiety and (2) synthetic resins obtained by esterifying polyvinyl alcohol with monochloroacetic acid, etherifying the esterified product with dihydropyrane and aminating the resulting ether with a di-lower alkylamine containing 1–4 carbon atoms on each alkyl moiety can be with advantage used for coating oral preparations which are to be dissolved in the stomach.

Detailed descriptions of the process described above are given below.

(1) Polyvinyl alcohol, partially butyralized polyvinyl alcohol or hydrolyzate of copolymer of vinyl acetate and crotonic acid is reacted with monochloroacetic acid in water at an elevated temperature between about 80° and 110° C. The reaction mixture is then chilled to a temperature between about 40° and 60° C. at which temperature acetalization is conducted with the aliphatic aldehyde in the presence of a mineral acid such as hydrochloric or sulfuric acid. After completion of the reaction, precipitates formed are separated, followed by dissolution in an organic solvent such as ketones, for example, acetone, and alcohols, for example, methanol. The resulting solution is then poured into water and fibrous or rubbery precipitates thus formed are separated by filtration or centrifugal procedure, followed by drying to obtain a white or pale brownish yellow fibrous or rubbery substance. The product is dissolved in an organic solvent such as ketones, for example, acetone, and alcohols, for example, methanol and a mixture of the resulting solution with the dialkylamine is heated under reflux. The reaction mixture is then poured into water and white or pale brownish yellow fibrous or rubbery precipitates are separated by filtration or centrifugal procedure.

The esterification step in the above described process, that is, the step of reacting polyvinyl alcohol, partially butyralized polyvinyl alcohol or hydrolyzate or copolymer of vinyl acetate and crotonic acid with monochloroacetic acid, is advantageously carried out in the presence of a mineral acid such as hydrochloric or sulfuric acid. The presence of a mineral acid such as hydrochloric or sulfuric acid, resultsin important advantages, such as lowering of the eraction temperature, reducing the reaction time, and reducing the amount of monochloroacetic acid required for the reaction. The amount of monochloroacetic acid used is dependent upon such conditions as the presence or absence of mineral acid in the reaction and the nitrogen content desired in the final product. Theoretical amount of monochloroacetic acid to be used would be about 0.2 to 0.7 part by weight per one part by weight of polyvinyl alcohol, partially butylralized polyvinyl alcohol or hydrolyzate or copolymer of vinyl acetate and crotonic acid. However, the amount of the former used in practice is about 1.5 to 5 parts by weight per one part by weight of the latter in the presence of mineral acid and at least about 3.0 parts by weight in the absence of mineral acid. In general, it is preferable to react one part by weight of polyvinyl alcohol, partially butyralized polyvinyl alcohol or hydrolyzate of copolymer of vinyl acetate and crotonic acid with about 1.5–5 parts by weight of monochloroacetic acid in water at about 80–110° C. for about 3–5 hours in the presence of a mineral acid such as hydrochloric or sulfuric acid. No particular limitations are given as to the nature of the polyvinyl alcohol, partially butyralized polyvinyl alcohol and hydrolyzate of copolymer of vinyl acetate and crotonic acid, but from a practical point of view it is advantageous to use polyvinyl alcohol having a viscosity of 4–45 centipoise at 20° C. in a 4% aqueous solution, partially butyralized polyvinyl alcohol that has a degree of butyralization of about 4–10% by weight and a viscosity of about 200–500 centipoise in a 15% aqueous solution or hydrolyzate of copolymer composed of 90–95% by weight of vinyl acetate and 10–5% by weight of crotonic acid that has a viscosity of about 360–440 centipoise in a 30% methanol solution.

The subsequent acetalization step which involves reaction of the resulting ester product with an aliphatic aldehyde is conducted in the presence of a mineral acid, the addition of which at said acetalization step is not needed if the preceding esterification step has been carried out in the presence of the mineral acid. The amount of the aldehyde used is dependent upon wt. percent acetal content desired for the final product. Generally speaking, it is advantageous to use about 0.7–1.5 parts by weight of the aliphatic aldehyde per one part of polyvinyl alcohol, partially butyralized polyvinyl alcohol or hydrolyzate of copolymer of vinyl acetate and crotonic acid used as the starting material, though the theoretical amount may be about 0.25–0.3 part by weight. The aliphatic aldehyde used for the process of the present invention is an aliphatic aldehyde containing 2–4 carbon atoms and includes acetaldehyde, n-butylaldehyde and isobutylaldehyde.

The final amination step of the product obtained as above from the esterification and acetalization steps is achieved by heating the esterified and acetalized product with a dialkylamine in an organic solvent such as ketones, for example, acetone, and alcohols, for example, methanol. The amount of dialkylamine used in the reaction depends upon the amount of monochloroacetic acid actually consumed in the esterification step, that is to say, the degree of esterification. For example, about 0.4–1.0 part by weight of the dialkylamine is ordinarily used per one part by weight of the starting polyvinyl alcohol, partially butyralized polyvinyl alcohol or hydrolyzate of copolymer of vinyl acetate and crotonic acid, though the theoretical amount of the former for the latter may be about 0.17–0.55 part by weight. The dialkylamine used in the process of this invention is a di-lower alkylamine containing 1–4 carbon atoms on each alkyl moiety and includes, for example, diethylamine, dipropylamine and dibutylamine.

(2) Reaction of polyvinyl alcohol with monochloroacetic acid is effected in the same way as above, in water at an elevated temperature between about 80–110° C. The resulting reaction mixture is chilled to about 50–60° C. at which temperature etherification is conducted with dihydropyrane in the presence of a mineral acid. After completion of the reaction, cold water is added to the reaction mixture to precipitate a glutinous mass, which is separated by decantation. The separated product is then dissolved in an alcohol, such as for example, methanol. The resulting solution is poured into water to precipitate a glutinous mass, which is separated by decantation and dried to give a pale brownish yellow glutinous substance. The glutinous product is then dissolved in an alcohol, such as for example, methanol and a mixture of the solution with a dialkylamine is heated under reflux. The reaction mixture is poured into water to precipitate a pale brownish yellow rubbery mass, which is separated by filtration or centrifugal procedure.

The esterification step in the above-described process, that is, the reaction of polyvinyl alcohol with monochloroacetic acid, is carried out under the same conditions as those in the esterification step described under (1).

The subsequent etherification step where the esterified product is reacted with dihydropyrane is conducted in the presence of a mineral acid, the addition of which is not needed in this step if the preceding esterification step has been carried out in the presence of the mineral acid. The amount of dihydropyrane used is dependent upon wt. percent tetrahydropyranyl ether content desired for the final product, that is to say, the degree of etherification. In general, it is preferable to use about 0.8–1.6 parts by weight of dihydropyrane per one part by weight of polyvinyl alcohol used as the starting material, though the theoretical amount required would be about 0.4–0.8 part by weight.

The amination step, that is, the step for reaction of the esterified and etherified product thus obtained with a dialkylamine is effected by heating with the dialkylamine in an alcohol, such as for example, methanol. The amount of dialkylamine used depends upon the amount of monochloroacetic acid actually consumed in the first esterification step, that is to say, the degree of esterification. For example, the theoretical amount of dialkylamine required for the reaction would be about 0.17–0.55 part by weight, but in practice about 0.4–1.0 part by weight is ordinarily used. The dialkylamine used is a dialkylamine containing 1–4 carbon atoms on each alkyl moiety and includes, for example, diethylamine, dipropylamine and dibutylamine.

The pharmaceutical coating composition obtained in the process according to the present invention has properties as indicated below. The pharmaceutical coating composition obtained by the process described above under (1) is a white or pale yellow fibrous or rubbery substance, which has a nitrogen content of about 1.5–5.0% by weight and an acetal content of about 55–65% by weight. The pharmaceutical coating composition obtained by the process described above under (2) is a pale brownish yellow rubbery substance, which has a nitrogen content of about 1.5–5.0% by weight and a tetrahydropyranyl ether content of about 40–70% by weight. Both the pharmaceutical coating compositions obtained by the processes described above under (1) and (2) are thermoplastic, insoluble in water but soluble in most of a number of solvents such as acetone, methanol, ethanol and chloroform. They are also soluble in the acid medium of the stomach, at a pH of between about 2 and 6. These pharmaceutical coating compositions adhere well to the body being coated, but on the other hand the coated products tend not to stick together when in the same container. Thus it is not in general necessary to apply a powder or other separating agent to the products obtained according to the invention. Officially approved dyes for food, dyes for food approved by the Food and Drug Administration, and natural dyes such as β-carotene, as well as artificial sweetening agents such as cyclohexanemethanesulfonic acid, titanium oxide, Carbowax such as Carbowax 4000–6000, and edible oils such as rape-seed and castor oil may also be incorporated in the coating composition.

Properties of some embodiments of the pharmaceutical coating compositions obtained according to the process of this invention are indicated in the preceding table.

Coating of pharmaceutical preparations with the pharmaceutical coating compositions according to the invention may be carried out in any convenient manner, and is applicable to the coating of pharmaceutical preparations adapted for oral administration, such as tablets and pills. The coatings are thus conveniently applied from solutions in suitable solvents such as ethanol and isopropanol, for example, by spraying, dipping, or tumbling by using conventional techniques.

In order that the invention may be well understood, the following examples are given by way of illustration only. In the examples below, the disintegration test is carried out by making measurements according to the U.S.P. XVI method at 37° C. without disk.

EXAMPLE 1

To a solution of 156 g. of polyvinyl alcohol having a degree of polymerization of about 500, trade named Gohsenol NL-05 and manufactured by The Nippon Synthetic Chemical Industry Co., Ltd., in 468 g. of water are added 475 g. of monochloroacetic acid. The mixture is heated at 100–110° C. for 4 hours. After chilling to 40° C., 220 g. of paraldehyde are added to the reaction mixture, followed by stirring. To the resulting mixture are added 75 ml. of 50 v./v. percent sulfuric acid, followed by stirring at 40° C. for 2 hours. Solid matter thus formed is separated from the aqueous layer, washed and dissolved in 1560 ml. of acetone. The acetone solution is added dropwise to 15 l. of water with stirring by an agitator to precipitate a white fibrous substance. The intermediary product is separated by filtration, washed with water and dried; weight 198 g. This product, softening point 90–95° C. and decomposing point 140–145° C., is readily soluble in acetone, ethyl acetate and chloroform, but is insoluble in methanol and ethanol.

*Analysis.*—Found: C, 55.98; H, 8.63; Cl, 4.62. The infrared spectrum is shown in FIG. 1.

To a solution of 150 g. of the intermediate in 1.5 l. of acetone are added 55 g. of diethyl amine and the mixture is heated on a steam bath under reflux for 2 hours. After cooling, the acetone reaction solution is added dropwise to 15 l. of water with stirring by an agitator to precipitate white fibrous substance, which is separated by filtration, washed with water and dried in blowing air at 40–50° C. Polyvinyl acetoacetal diethylamino acetate weighing 117 g. is obtained; yield 99% on the basis of weight of starting material. This product, softening point 85–95° C. and decomposing point 100–110° C., is readily soluble in methanol, ethanol, ethyl acetate, chloroform and acetone. It is also rapidly dissolved in synthetic gastric juice.

Figure 2:
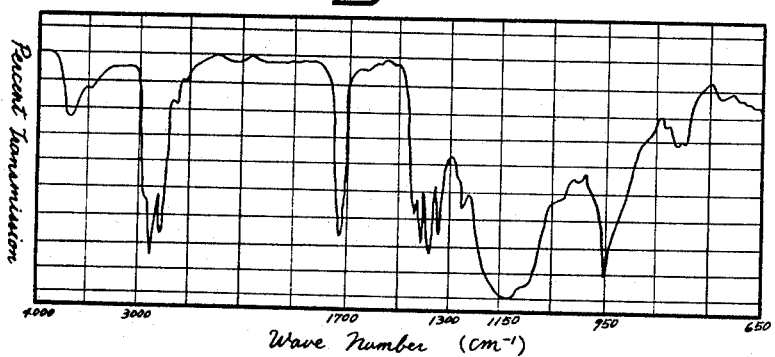

*Analysis.*—Found: C, 60.39; H, 8.83; N, 2.29. The infrared spectrum is shown in FIG. 2.

Tablet preparations may be coated with the material thus produced. For example, to a powdered mixture of 1300 g. of lactose and 200 g. of dextrine are added 500 g. of 5% starch paste. The resulting mixture is well mixed, subsequently passed through a No. 14 mesh screen and dried. The resulting matter is granulated through a No. 12 mesh screen. The granules are mixed with about 2% of talcum and about 1% of magnesium stearate for lubrication and then tableted to tablets each weighing 310 mg. and having a diameter of ⅜″ and a radius of curvature of $^{17}\!/_{64}$″. The coating material obtained as above, weighing 50 g., is dissolved in 225 g. of acetone and 225 g. of methanol. Three thousand uncoated tablets placed in a coating pan of a diameter of 8 inches are subjected to consecutive coatings with 5 portions of 100 g. of the aforementioned solution to obtain tablets each weighing 320 mg.

The coated tablets remain unchanged after immersion in distilled water for 4 hours, but are disintegrated in synthetic gastric in 16 min. This disintegration in gastric juice is the same as that of uncoated tablets.

EXAMPLE 2

Figure 3:
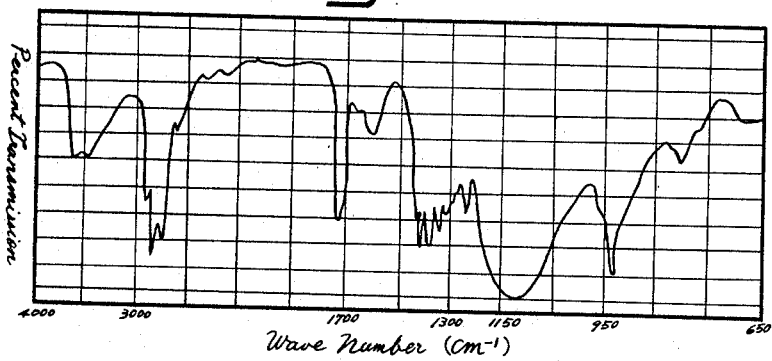

A mixture of 25 g. of partially butyralized polyvinyl alcohol having a butyral content of 4–10 wt. percent and a degree of polymerization of about 500, manufactured by Sekisui Chemical Co., Ltd. under the trade name Sleck W202, 76 g. of monochloroacetic acid, 75 g. of water and 12 ml. of 50 v./v. percent sulfuric acid is heated in a steam bath with occasional stirring at 80–90° C. for 3 hours. After completion of the reaction, the reaction mixture is chilled to 25° C., followed by addition of 35.2 g. of paraldehyde all at a time with stirring. The temperature of the liquor is then raised to 30° C. the resulting liquor is allowed to stand with occasional stirring for 1.5 hours whereby a solid glutinous substance separates. To the solid gutinous mass are added 400 ml. of 2.5 v./v. percent methanol solution of sulfuric acid with stirring and cooling to a homogeneous solution. The solution is poured dropwise into water to precipitate a white fibrous material, which is separated by filtration, washed with water and dried. Thirty grams of the intermediate are obtained. The intermediate, softening point 85–90° C. and decomposing point 140–145° C., is readily soluble in acetone, ethyl acetate and chloroform but insoluble in methanol and ethanol. *Analysis.*—Found: C, 55.68; H, 7.60; Cl, 5.53. The infrared spectrum is shown in FIG. 3.

To a solution of 30 g. of the above-obtained intermediate in 300 ml. of acetone are added 15 g. of diethyl amine. The mixture is heated in a steam bath under reflux for 2 hours. After cooling, the reaction mixture is poured dropwise into 3 l. of water to precipitate a white fibrous material. This material is collected, washed with water, followed by purification by the same procedure in water as above and dried. The purified product, weighing 28 g., softening point 85–95° C. and decomposing point 100–110° C., is soluble in methanol, ethanol, acetone, ethyl acetate and chloroform and rapidly soluble in synthetic gastric juice.

Figure 4:
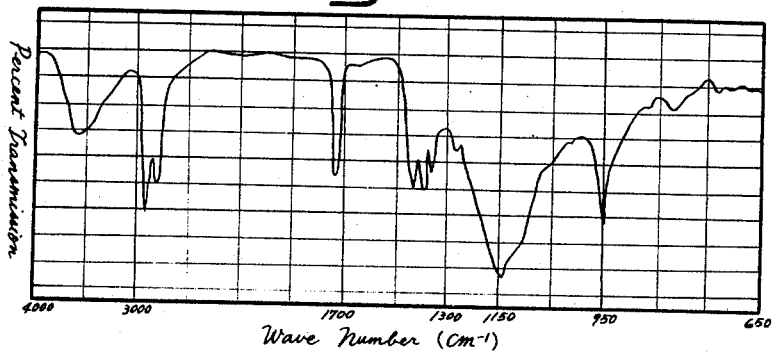

*Analysis.*—Found: C, 59.54; H, 8.59; N, 2.64. The infrared spectrum is shown in FIG. 4. The product is polyvinyl acetoacetal n-butylacetal diethylamino acetate.

A solution of 50 g. of the product in 450 g. of acetone is applied to lactose-dextrin tablets each weighing 310 mg. in the same way as described in Example 1 and from the coated tablets are prepared sugar coated tablets by the known method. The sugar-coated tablets are not disintegrated after standing in distilled water for 4 hours, but are disintegrated in synthetic gastric juice in 10–15 min.

EXAMPLE 3

To a solution of 42 g. of partially butyralized polyvinyl alcohol having a butyral content of 5 percent by weight and a degree of polymerization of about 500, manufactured by Sekisui Chemical Co., Ltd. under the trade name Sleck W202, in 145 ml. of water are added 127 g. of monochloracetic acid. The mixture is heated at 100–105° C. for 4 hours. After completion of the reaction, the reaction mixture is chilled to 40° C., followed by addition of 96 g. of n-butylaldehyde. The resulting mixture is well stirred and 20 ml. of 50 v./v. percent sulfuric acid are then added. The resulting mixture is allowed to stand with stirring at 40° C. for 2 hours. From the content, solidified to a glutinous matter is separated the aqueous layer and the solid is washed with water and dissolved in 400 ml. of acetone. The acetone solution is poured dropwise into 7 l. of water to precipitate a brownish yellow rubbery substance. The intermediate, after washing with water and drying, weighs 90 g. It is readily soluble in acetone, ethyl acetate and chloroform, but insoluble in methanol and ethanol; softening point 55–60° C.; decomposing point 115–120° C.

Figure 5:
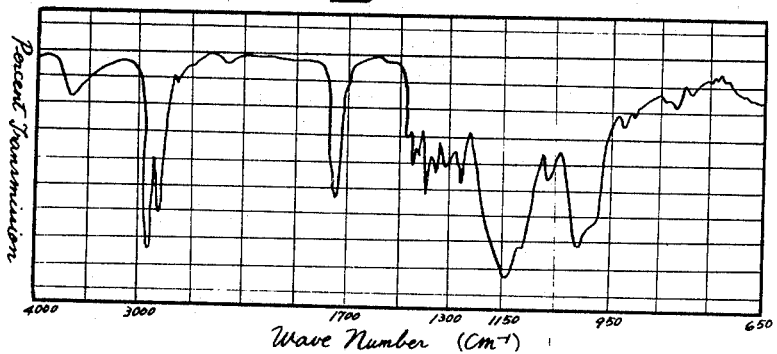

Analysis.—Found: C, 60.96; H, 9.36; Cl, 5.54. The infrared spectrum is shown in FIG. 5.

To a solution of 30 g. of the above-obtained intermediate in 300 ml. of acetone are added 15 g. of diethylamine. The mixture is heated in a steam bath under reflux for 2 hours. On pouring into 3 l. of water after cooled, pale brownish yellow rubbery substance is obtained. The rubbery substance thus precipitated is collected, and washed with water, followed by purification by dissolving in acetone, pouring the acetone solution into water, separation and drying, to yield 28 g. of the desired product. The product, softening point 50–55° C. and decomposing point 180° C., is rapidly dissolved in synthetic gastric juice and also soluble in methanol, ethanol, ethyl acetate, acetone and chloroform.

Figure 6:
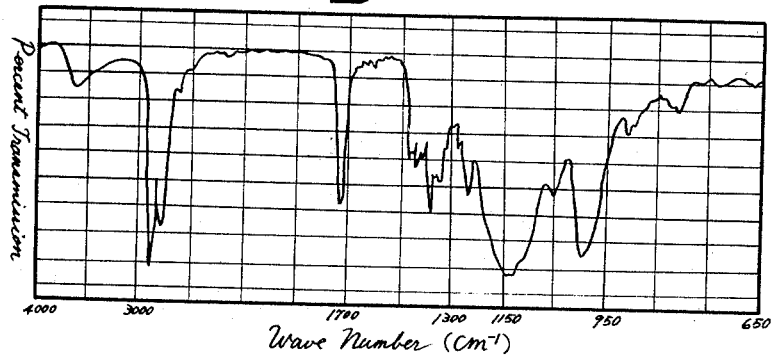

Analysis.—Found: C, 64.36; H, 9.78; N, 2.39. The infrared spectrum is shown in FIG. 6. The product is polyvinyl n-butylacetal diethylamino acetate.

Lactose-dextrine tablets are coated with methanol solution of the material thus obtained in the same way as in Example 1. The coated tablets remain unchanged after submersion in distilled water for 4 hours but are disintegrated in synthetic gastric juice in 10–15 min., which disintegration progress is the same as for uncoated tablets.

EXAMPLE 4

The same procedures are repeated as in Example 3, except that 96 g. of iso-butylaldehyde is used in place of the n-butylaldehyde.

Ninety-four grams of the chlorine-containing intermediate are obtained as white rubbery matter; softening point 45–50° C.; decomposing point 170–175° C. It is soluble in acetone, chloroform and ethyl acetate and insoluble in methanol and ethanol.

Figure 7:
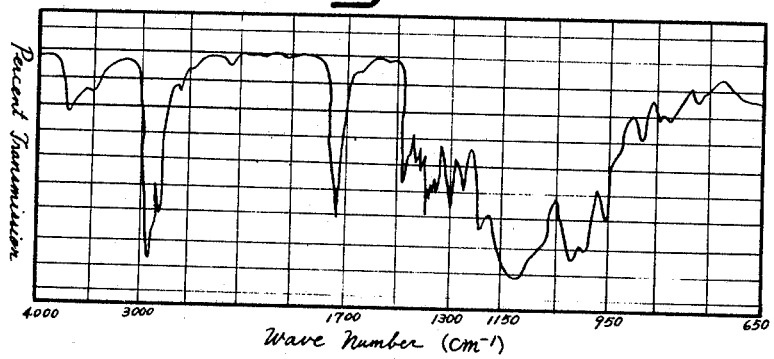

Analysis.—Found: C, 60.55; H, 8.76; Cl, 3.85. The infrared spectrum is shown in FIG. 7.

Twenty-eight grams of the desired product are obtained as white rubbery matter; softening point 58–60° C.; decomposing point 200° C. It is soluble in synthetic gastric juice as well as in methanol, ethanol, ethyl acetate, acetone and chloroform.

Figure 8:
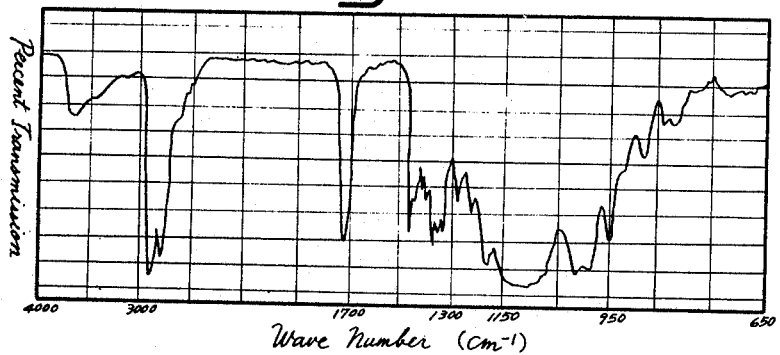

Analysis.—Found: C, 64.88; H, 10.05; N, 2.07. The infrared spectrum is shown in FIG. 8. The product is polyvinyl n-butylacetal iso-butylacetal diethylamino acetate.

Lactose-dextrine tablets are coated with methanol-acetone (1:1) solution of the material thus obtained in the same way as in Example 1. Sugar tablets are prepared therefrom by the known method. The sugar-coated tablets are not distintegrated after being allowed to stand in distilled water for 4 hours, but are distintegrated in synthetic gastric juice in 10–15 min.

EXAMPLE 5

To a solution of 31.2 g. of polyvinyl alcohol having a degree of polymerization of about 500 are added 95 g. of monochloroacetic acid. The mixture is heated at 100–110° C. for 4 hours. After completion of the reaction, the reaction mixture is chilled to 50° C., followed by addition of 45 g. of dihydropyrane and 1 ml. of concentrated hydrochloric acid. The resulting mixture is heated in a steam bath at 55–60° C. with stirring for 1 hour. After cooling, water is added to the reaction mixture to precipitate a glutinous substance, which is separated and washed thoroughly with water. The glutinous mass is then dissolved in 312 ml. of methanol and the solution is poured dropwise with stirring into 3 l. of water to precipitate a pale brownish yellow glutinous substance, which is washed with water and dried to obtain 68 g. of the intermediate. The intermediate has a softening point of 60–65° C. and a decomposing point of 160–172° C.

Figure 9:
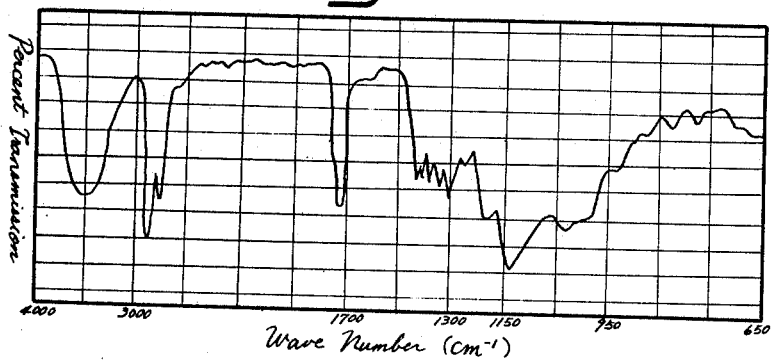

Analysis.—Found: C, 54.45; H, 8.12; Cl, 9.95. The infrared spectrum is shown in FIG. 9.

Thirty grams of the above obtained intermediate are dissolved in 300 ml. of methanol and to the solution are added 15 g. of dipropylamine. The resulting mixture is heated under reflux in a steam bath for 2 hours. After cooling, the reaction mixture is poured dropwise into 3 l. of water to precipitate a pale brownish yellow rubbery mass which is collected, followed by purification by dissolving in methanol, pouring onto ice and drying to yield 27 g. of the desired product. The product, softening point 55–65° C. and decomposing point 160–172° C., is soluble in synthetic gastric juice as well as in methanol and ethanol, but is insoluble in acetone, ethyl acetate and chloroform.

Figure 10:
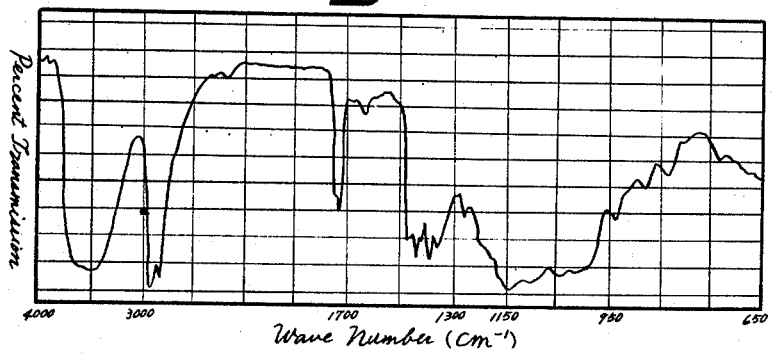

Analysis.—Found: C, 61.11; H, 10.01; N, 2.05. The infrared spectrum is shown in FIG. 10. The product is polyvinylpyranylether diisopropylamino acetate.

Lactose-dextrine tablets are coated with a methanol solution of the material thus obtained in the same way as in Example 1. The tablets coated with the material are not disintegrated after submersion in distilled water for 4 hours but are disintegrated in synthetic gastric juice in 20 min., which disintegration progress is the same as that of uncoated tablets.

EXAMPLE 6

To a solution of 172 g. of a copolymer of vinyl acetate and crotonic acid containing crotonic acid as much as 5 mol. percent, manufactured by The Nippon Synthetic Chemical Industry Co., Ltd. under the trade name Gohseran C, in 1 l. of methanol is added with stirring a solution of 34 g. of sodium hydroxide in 80 ml. of water. The mixture is allowed to stand at 37° C. for 12 hours. Fibrous mass thus precipitated is collected, washed with a mixed solvent of methanol-acetone (1:1) and dried; yield 86 g.

To a solution of 63 g. of the hydrolyzate thus obtained in 187 ml. of water are added 190 g. of monochloroacetic acid. The mixture is heated at 100–105° C. for 4 hours. After cooling to 40° C., 88 g. of paraldehyde are added to the reaction mixture, followed by dropwise addition of 30 ml. of 50 v./v. percent sulfuric acid with vigorous stirring. The resulting mixture is heated at 40° C. for 2 hours, to precipitate a white fibrous mass, which is separated, washed with water and dissolved in 625 ml. of acetone. The solution is poured dropwise into 7 l. of water. The mass thus precipitated is separated, washed with water and dried to obtain 70 g. of the intermediate. The intermediate, softening point 100–105° C. and decomposing point 150–160° C., is insoluble in methanol and ethanol, but is soluble in acetone, ethyl acetate and chloroform.

Figure 11:
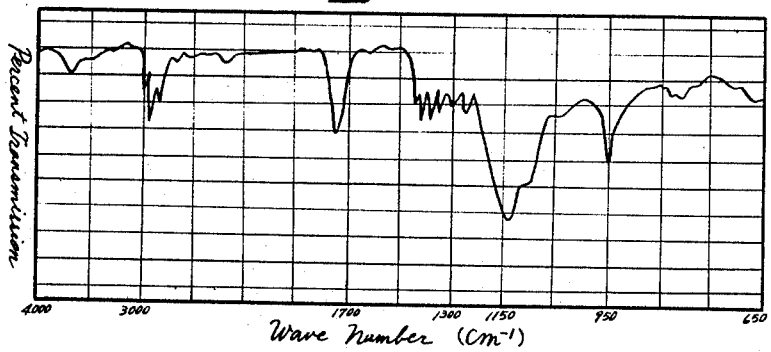

*Analysis.*—Found: C, 56.07; H, 7.84; Cl, 7.08. The infrared spectrum is shown in FIG. 11.

Thirty grams of the intermediate thus obtained are dissolved in 300 ml. of acetone and to the solution are added 15 g. of diethylamine. The mixture is heated under reflux in a steam bath for 2 hours. After cooling, the reaction mixture is poured dropwise to 3 l. of water to precipitate a white fibrous substance. The substance is collected and washed with water, followed by purification by dissolving in acetone, pouring into water and drying to yield 28 g. of the desired product. The product, softening point 75–80° C. and decomposing point 150° C., is rapidly dissolved in synthetic gastric juice and is soluble in acetone, methanol, ethanol, ethyl acetate and chloroform.

Figure 12:
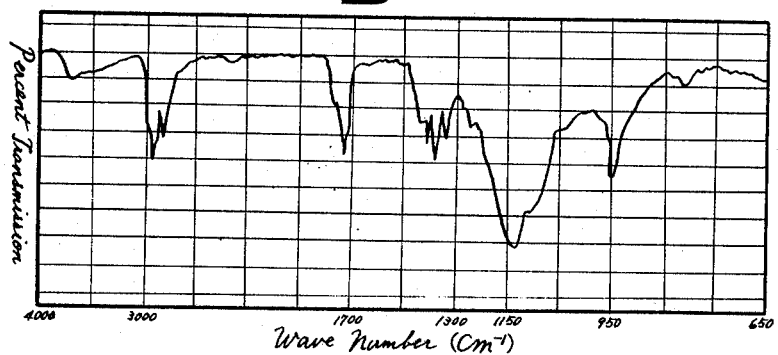

*Analysis.*—Found: C, 60.53; H, 8.71; N, 2.27. The infrared spectrum is shown in FIG. 12. The product is acetoacetal diethylamino acetate of copolymer of vinyl alcohol and crotonic acid.

Lactose-dextrine tablets are coated with methanol solution of the substance thus obtained in the same way as in Example 1. The coated tablets are not disintegrated after submersion in distilled water for 4 hours, but are disintegrated in synthetic gastric juice in 10–15 min., which disintegration progress is quite the same as for uncoated tablets.

The structural formulae of the end products obtained according to Examples 1 through 6 are as follows:

| Example No. | Name | Structural formula[1] |
|---|---|---|
| 1 | Polyvinylacetoacetal diethylamino acetate | (structure) |
| 2 | Polyvinyl acetoacetal n-butylacetal diethylamino acetate | (structure) |
| 3 | Polyvinyl n-butylacetal diethylamino acetate | (structure) |
| 4 | Polyvinyl n-butylacetal iso-butylacetal diethylamino acetate | (structure) |
| 5 | Polyvinylpyranylether diisopropylamino acetate | (structure) |

See footnote at end of table.

| Example No. | Name | Structural formula[1] |
|---|---|---|
| 6 | Acetoacetal diethylamino acetate of copolymer of vinyl alcohol and crotonic acid. | |

[1] Structural formula is represented by a main chain structure.

Specific reference is had to the affidavits which we filed in application Ser. No. 184,889 with the amendment dated Feb. 13, 1963.

What is claimed is:

1. Film forming polyvinylacetoacetal diethylamino acetate, having the main chain structure:

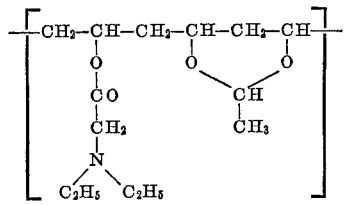

2. Film forming polyvinyl acetoacetal n-butylacetal diethylamino acetate, having the main chain structure:

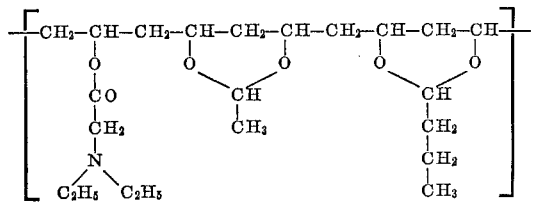

3. Film forming polyvinyl n-butylacetal diethylamino acetate, having the main chain structure:

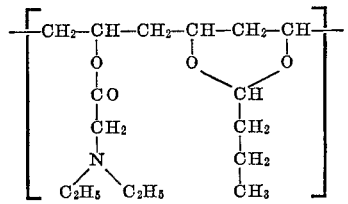

4. Film forming polyvinyl n-butylacetal iso-butylacetal diethylamino acetate, having the main chain structure:

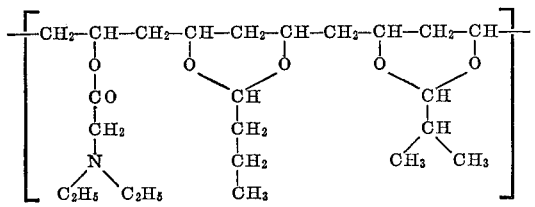

5. Film forming polyvinylpyranylether diisopropylamino acetate, having the main chain structure:

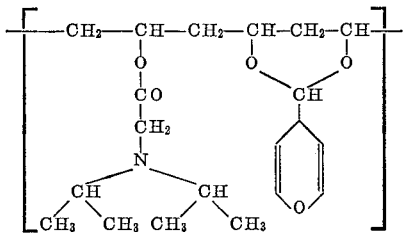

6. Film forming acetoacetal diethylamino acetate of copolymer of vinyl alcohol and crotonic acid, having the main chain structure:

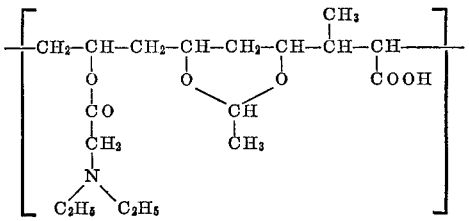

References Cited

UNITED STATES PATENTS 2,145,345  1/1939  Dreyfus.
2,448,260  8/1948  Flodin.
2,992,204  7/1961  Osugi et al.
3,023,199  2/1962  Hawthorne et al.

WILLIAM H. SHORT, Primary Examiner

L. M. PHYNES, Assistant Examiner

U.S. Cl. X.R.

260—72, 85.7, 91.3; 424—33, 78